Patented Apr. 17, 1951

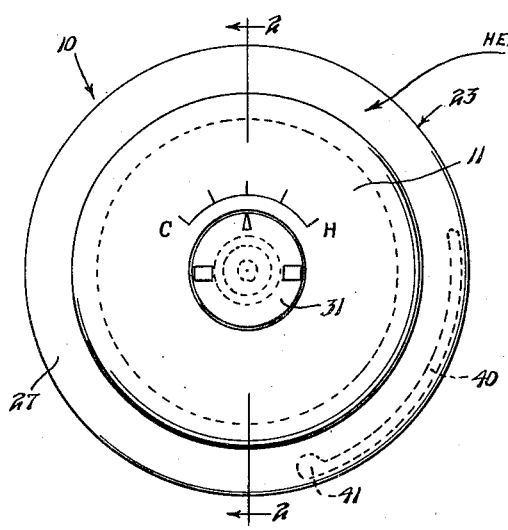
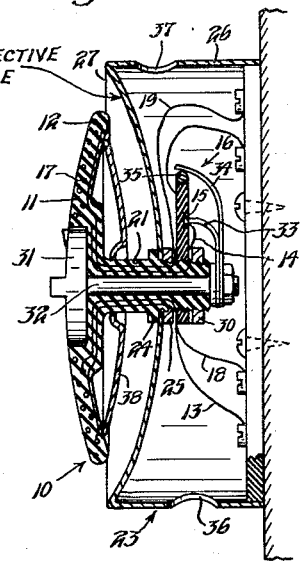
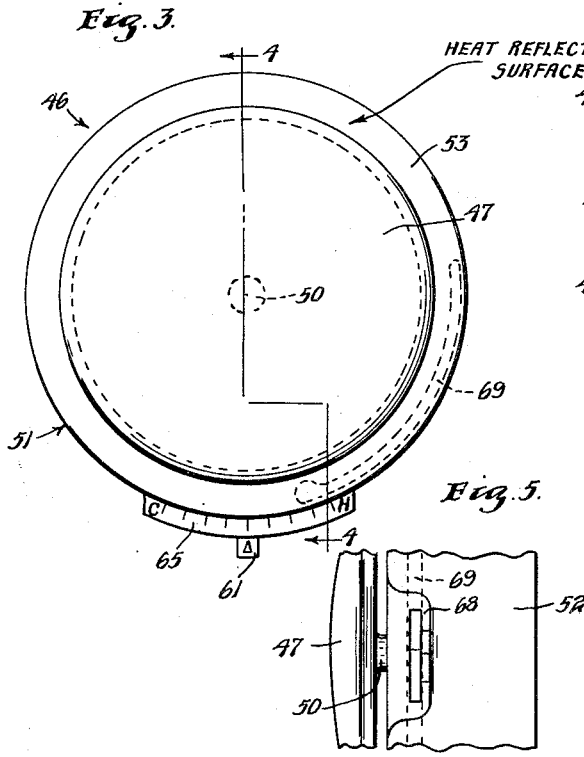
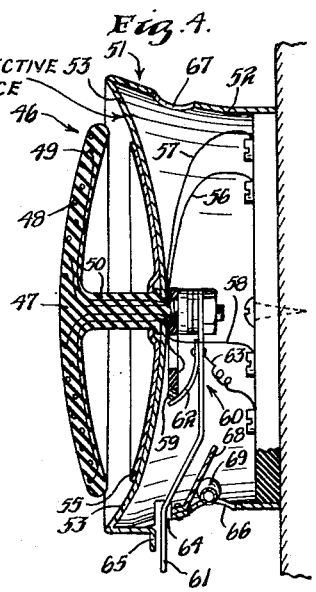
Inventor
LAMONT B. KOONTZ
BY George H. Fisher
Attorney

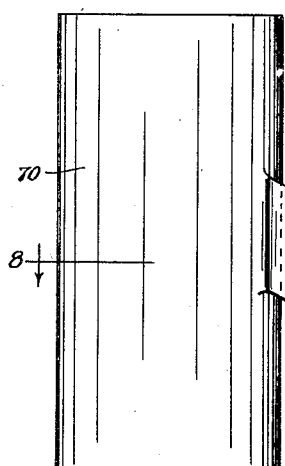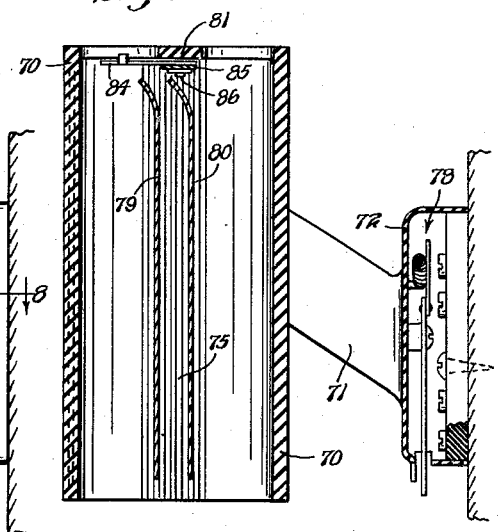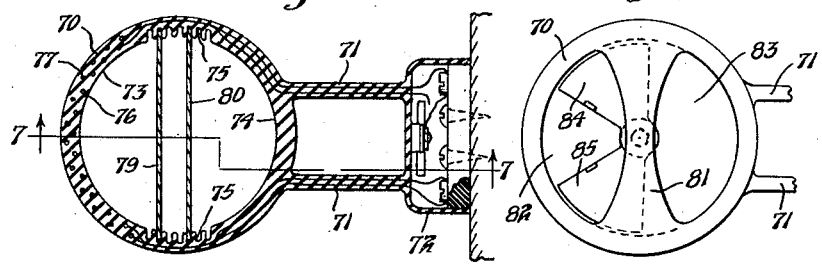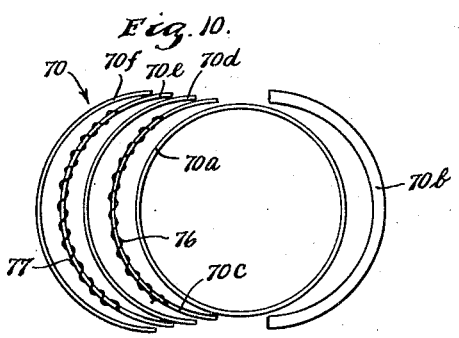

2,549,209

UNITED STATES PATENT OFFICE 2,549,209

CONTROL APPARATUS

Lamont B. Koontz, Minneapolis, Minn., assignor to Minneapolis-Honeywell Regulator Company, Minneapolis, Minn., a corporation of Delaware Application June 26, 1948, Serial No. 35,462

16 Claims. (Cl. 323—68)

The present invention relates to control devices responsive to a plurality of conditions including thermal radiation.

Control devices of the heat emissive type and responsive to thermal radiation, air motion and air temperature have generally been confined to the laboratory, the principal objection to their use in homes being the relatively unattractive appearance of the existing devices and the inability to mount such a device on a wall without it being unduly influenced by the wall. It is thus an object of this invention to provide an improved control device responsive to a plurality of conditions such as thermal radiation, air motion and air temperature.

It is another object to provide a heat emissive control device that is acceptable in appearance and adapted for wall mounting.

It is a further object to provide a control device responsive to a plurality of conditions including thermal radiation that can be mounted on a wall without being unduly affected thereby and that is capable of responding to radiant effects throughout the major portion of the room.

It is an additional object to provide a control device responsive to air temperature, air motion and thermal radiation wherein the portions of the total response attributable to these different conditions may be varied.

It is also an object to provide a heat emitting control device arranged to deflect convection air currents away from the wall on which the device is mounted.

It is another object to provide a heat emitting control device having a thermometer so arranged that it will be relatively unaffected by the operating temperature of said device and will reasonably accurately respond to room air temperature.

These and other objects will become apparent upon a study of the following specification and drawings wherein:

Figure 1 is a front elevation of a preferred embodiment of the present device.

Figure 2 is a cross-section view taken on the line 2—2 of Figure 1.

Figure 3 is a front elevation of a modification of the device shown in Figure 1.

Figure 4 is a cross-sectional view taken on the line 4—4 of Figure 3.

Figure 5 is a fragmentary view of the right elevation of the device of Figure 3.

Figure 6 is a side elevation of a modification of the present invention.

Figure 7 is a vertical section of the device of Figure 6 taken as shown by the line 7—7 of Figure 8.

Figure 8 is a horizontal section of the device of Figure 6 taken on the line 8—8.

Figure 9 is a plan view of a portion of the device of Figure 6.

Figure 10 is a schematic view showing a suggested manner of assembly of the cylinder of the device of Figures 6 through 9.

Figure 11 is a suggested skeleton member for a winding of the device of Figures 1 and 2.

The present control device preferably includes a temperature responsive electrical resistor and is intended to be substituted for the room thermostat in control systems comprising an electrical network circuit, such as disclosed in Gille et al. Patent 2,375,988, issued May 15, 1945, and the copending application of Wissmiller et al., Serial No. 695,014, filed September 19, 1946, now Patent No. 2,524,754, issued October 10, 1950.

Referring to the drawings, device 10 of Figures 1 and 2 comprises a convex heat radiating temperature responsive member 11, said member being circular in shape and constructed of a material having good heat radiating properties and preferably an electrical insulator, such as hard rubber or the like. Member 11 has two sets of windings of resistance wire embedded therein, the outer winding 12 comprising temperature responsive resistance wire of a material such as nickel, the end or connecting portion 13 of this winding being attached to a suitable terminal, while the other end or portion 14 of the winding 12 is attached to a contact sector 15 of a rheostat 16. The other winding 17 embedded in member 11 comprises resistance wire having a low temperature coefficient of resistance, such as Nichrome, and its ends or connecting wires 18 and 19 are connected to suitable heater terminals. Resistor wires 12 and 17 may be embedded or molded in member 11 in any suitable fashion or they may be wound on suitable core members such as 20 in Figure 11 and then assembled and molded as suggested in Figure 10. The member 11 is preferably formed with a rearwardly extending integral hollow mounting stem 21, said mounting stem being threaded and attached to a base member 23 by suitable flange 24 and nut 25. Connecting wires 13, 14, 18 and 19 may be molded in stem 21, inserted through holes therein, or otherwise suitably disposed.

Base member 23 comprises a thin cylindrical wall portion 26 and a concave bottom or outer portion 27, the portion 27 being arranged to face outwardly, as shown in Figure 2. Base member 23 is preferably made of material having low heat capacity and relatively poor thermal conductivity, cellular hard rubber, thin metal, or other suitable material being usable for this purpose. To make concave surface 27 most effective for reflecting heat, it is covered, or otherwise coated, with a metallic surface such as polished metal foil or leaf of copper, gold, or the like, these metals being preferable because of their good heat reflecting characteristics and their resistance to tarnishing. Member 11 is attached to base means 23 in such a manner that most of the direct radiation from member 11 is either directed outwardly or reflected outwardly from the base portion of the device, said surface 27 intercepting direct radiation from member 11 toward the relatively near portions of the wall to which device 10 is attached. Thus, by preventing direct radiation from member 11 to the near wall and by providing a relatively long and inefficient thermal path between member 11 and the wall, the ability of the wall to absorb heat from the device 10 is minimized.

In addition to stem 21 of device 11 being used for mounting device 11 to base number 23, rheostat 16 is also mounted on this stem by a suitable nut 30, rheostat 16 being adjustable by a knob 31 having a shaft 32 extending through the hollow stem 21 and carrying resilient contact arms or wipers 33 and 34, arm 33 moving over contact member 15 and arm 34 wiping over resistor 35. Rheostat 16 is connected in series with temperature responsive resistance winding 12 to thereby vary the resistance of device 10 and thus vary its control point. To carry away the heat that may be caused by rheostat 16, as well as to reduce the cross-sectional area of wall member 26, slots 36 and 37 are provided, slot 37 being located near the outermost edge of the wall 26 so that induced air flow through base 23 will be directed outwardly from the wall.

In operation, this device is connected so that resistance winding 12 and rheostat 16 are connected in series in a network circuit, not shown. Also, heater winding 17 is connected to a relatively constant source of current sufficient to cause member 11 to operate at a temperature of about 85 to 95 degrees with a normal ambient room temperature. Then, due to the elevated temperature of 11, the same conditions tending to cool a human body in the room by increasing its loss or heat will also tend to cool member 11. Thus, if the air temperature falls, member 11 will be cooled; likewise, an increase in air movement will also tend to carry heat away from member 11. In addition, member 11 will radiate heat toward all cooler objects at a rate depending upon temperature differences and, because of its convex shape, this radiation will be toward all parts of the room with the exception of the wall portions relatively near the device. Thus, anything tending to increase the rate of heat loss from member 11 will lower its temperature and decrease the resistance of winding 12.

Depending upon the relative response to radiation, air motion and air temperature desired, adjustable insulating member 38 is moved back against surface 27 if a relatively large response to air temperature and air motion is desired, whereas, if a relatively larger response to radiation is desired, member 38 is moved forward to abutment with member 11 to thereby minimize the effect of air temperature and motion on the back side of member 11. This adjustment is usually made at the time of installation and need not be changed thereafter.

With member 11 operating at an elevated temperature, it obviously will tend to cause convection currents but because of the concave shape of portion 27, these convection currents are deflected outwardly away from the wall to thus minimize smudging of the nearby wall surface. Also, because of the rising air currents passing between members 11 and 27 tend to induce an air flow through slots 36 and 37, thermometer 40 having its bulb 41 near slot 36 is able to give a reasonably accurate response to room air temperature.

Device 46, shown in Figures 3, 4 and 5, is generally similar to that of Figures 1 and 2 and comprises a circular convex heat radiating temperature responsive member 47 having windings 48 and 49 corresponding to 12 and 17, respectively. Member 47 has a relatively small diameter stem 50 formed integral therewith and by which 47 is connected to a mounting means comprising a shell-like member 51 having a generally circular wall portion 52 and a concave bottom portion 53, the concave portion of bottom 53 being arranged to face outwardly and having a polished metallic surface similar to that above described. An adjustable concave insulating member 55 is movable along stem 50 to a position where it nests against concave portion 53 or it may be moved forward to abut member 47 as shown in Figure 2.

Wires 56 and 57, leading from heater winding 49, are connected to suitable terminals as is wire 58 of temperature responsive resistance winding 48, the other end of this temperature responsive resistance winding being connected to resistor 59 of a rheostat 60. An adjusting lever or arm 61 has attached thereto a flexible wiper 62 which engages resistor 59 and lever 61 is connected by a wire 63 to a suitable terminal.

Lever 61 extends through a slot 64 in wall 52, with a scale plate 65 being formed adjacent slot 64 to indicate the adjustment of 61. Slots 66 and 67, similar to 36 and 37 of Figure 2, permit air flow through base member 51 and an additional baffle plate 68 is arranged between the bulb of thermometer bulb 69 and rheostat 60 to shield the bulb from radiation from resistor 59. Because of the pinched-in shape of wall 52, a side portion of the wall 52 may be forced outwardly to some extent and slotted, as at 68 in Figure 5, to make the thermometer 69 more readily readable.

In operation, this device is the same as that above described with the exception that the control point is varied by adjusting lever 61 instead of knob 31. The device shown in Figures 6 through 9 is quite different in appearance but very similar in function to the devices above described. This device comprises a cylindrical member 70 attached by a pair of supporting arms 71 to a base member 72, said cylinder member 70 being preferably constructed of hard rubber or like material and arm 71 and base member 72 being formed of somewhat similar material but preferably being somewhat cellular in construction to retard heat transmission therethrough. Cylinder member 70 comprises two principal portions, 73 and 74, divided by a plurality of spaced longitudinally extending grooves 75, the grooves 75 reducing the cross-sectional area of member 70 between portions 73 and 74 to minimize heat conductivity between said portions. Front portion 73 has heater wires and temperature responsive resistor wires embedded therein, as in the previous example, said heater wires serving to heat the front portion 73 and the temperature responsive resistor wires 77 responding to the temperature of the portion 73.

As an example of how member 70 may be constructed, Figure 10 schematically shows cylinder 70 built up from a relatively thin wall cylindrical member 70a, to which is joined and suitably molded a semicylindrical portion 70b, portion 70b being of sufficient thickness so that it and 70a equal the full thickness of member 70. However, for the front portion of cylinder 70, a first relatively thin semicylindrical member 70c has the heater wires 76 wound thereon. Another similar member without wires, 70d is then arranged over 70c. Another semicylindrical member 70e has temperature responsive resistance wire 77 wound thereon, and the outer layer of this composite construction is formed by a relatively thin semicylindrical member 70f. Upon assembling cylinder 70, as schematically suggested in Figure 10, the composite cylinder is then subjected to heat and pressure for vulcanizing or molding the parts into a single homogeneous cylinder, by methods known in the art. At the time of this molding, or afterwards, grooves 75 may be formed in the said cylinder.

The connecting wires for element 76 and 77 may be led into base member 72 through supporting arms 71 in any suitable fashion and the heater wires connected to terminals, as before. Also, one of the temperature responsive resistor connection wires may be connected to a terminal and the other connected to a rheostat 78 in the same manner previously described. A pair of relatively thin and polished metal plates 79 and 80 are disposed in spaced relationship in grooves 75 and have their upper ends bent outwardly, as shown in Figure 7. These members 79 and 80 operate to prevent direct radiation of heat from portion 73 to portion 74 of the present device, and rising air currents through cylinder 70 are deflected outwardly by the outwardly bent ends of plates 79 and 80.

If desired, a cap structure 81 may be provided for cylinder 70, said cap structure having a pair of openings 82 and 83, opening 83 being on the back side of plate 80 and opening 82 being forward of plates 79 and 80. In addition, a pair of pivotally mounted closure members 84 and 85 may be mounted on a stem 86 of cap portion 81 to permit an adjustment of the size of opening 82 to thereby vary the proportionate response of the present device to radiation and to air temperature. When members 84 and 85 are arranged to close opening 82, then air movement is permitted only over the outer surfaces of portion 73 whereas, when opening 82 is opened, air motion is permitted on both sides of portion 73 thereby increasing the response of this device to changes in air temperature and air motion.

In operation, the device of Figures 6 through 9 is similar to that of Figures 1 through 5 and may be used in a condition controlling network circuit instead of the more conventional resistance thermostat.

In addition to the modifications shown above, many other substitutions and equivalents will occur to one skilled in the art, hence the scope of the present invention is to be determined only by the appended claims.

I claim:

1. In a condition responsive control device, a base member adapted to be attached to a wall and having a circular wall and an outwardly facing concave portion, a circular convex member having a rearwardly extending stem member for attaching said convex member in spaced relation to said concave portion, heater means for said convex member, temperature responsive means in heat exchange relation with said convex member, said concave member being of greater diameter than said convex member and arranged to intercept at least a major portion of direct radiation from said convex member toward a wall on which said device may be located, a heat reflective surface on the outer face of said concave portion, and a concave member arranged to be moved along said stem from a position adjacent said concave portion to a position engaging the back side of said convex member to thereby variably insulate the back side of said convex member from the surrounding air.

2. In a condition responsive device, a base member having a circular wall and an outwardly facing concave portion, a heat reflective surface on said concave portion, a circular convex member of less diameter than said base member and having a stem for attaching the same in spaced relation to said concave portion, heater means for said convex member, temperature responsive means in heat exchange relation with said convex member, said stem having only sufficient cross-sectional area to provide the necessary mechanical strength for said device to thereby minimize conductive heat flow from said convex member to said base member, and slots in said base member to permit air circulation through said base member and to minimize heat transfer from said convex member to a wall on which said device may be be mounted.

3. In a condition responsive control device of the heat emitting type, a member for radiating heat, a heater for said member, means responsive to the temperature of said member, heat reflective means arranged to reflect heat from said member outwardly, and heat insulating means adjustably arranged between the first named heat reflective means and said heat radiating member.

4. In a condition responsive control device of the heat emitting type, means for mounting said device on a wall of a room, a member for radiating heat, a heater for said member, means responsive to the temperature of said member, a reflector member for reflecting heat radiated by said member away from said wall, and means for variably insulating a portion of said member from the surrounding air.

5. In a condition responsive control device of the heat emitting type adapted to be mounted on a wall, a radiating member, a heater for said member, means responsive to the temperature of said member, a concave reflector member arranged in spaced relation to said radiating member for minimizing the direct radiation of heat from said radiating member to said wall, and manually operable means for adjustably insulating a portion of said radiating member from the surrounding air.

6. In a control device responsive to a plurality of conditions affecting human comfort, a convex member, means for heating said member, temperature responsive resistance means in heat exchange relation with said member, mounting means for securing said member in spaced relation to a wall of a room, said mounting means being constructed and arranged to provide a conductive heat flow path of small cross-sectional area, heat reflective means for reducing heat transfer from said member toward said mounting means.

7. In a control device responsive to a plurality of conditions affecting human comfort and adapted to be mounted on a side wall of a room, a convex member, mounting means for said member including a base spaced from said member, an electric resistance heater having a low temperature coefficient of resistance for heating said member, a resistance temperature responsive means having a relatively high temperature coefficient of resistance in heat exchange relation with said member, and concave heat reflective means arranged between said member and said base and in spaced relation to said member for reflecting heat and deflecting air currents away from said wall.

8. In a condition responsive device of the heat emissive type, a convex member having a hollow attaching stem and having a temperature responsive resistor embedded therein, a mounting means for said member having a generally circular wall portion and a concave reflector portion, said reflector portion having a metallic heat reflective surface, slots in said wall portion, said hollow stem and said mounting means providing a relatively long and restricted path for heat flow, a rheostat behind said concave portion, a manual adjusting knob having a shaft extending through said hollow stem for adjusting said rheostat, and a baffle plate arranged between said convex member and said mounting means and movable along said hollow stem.

9. A condition responsive control device for mounting on a wall of a room comprising a base member, a convex radiating member arranged in spaced relation to said base member, said convex member including temperature responsive means, means for adding heat to said member, a reduced section connecting means between said convex member and said base member, said connecting means comprising a relatively poor path for heat flow between said convex member and said wall to which said device is adapted to be attached, said base member being shaped and arranged to prevent direct radiation from said convex member to such a wall in the immediate vicinity of said device.

10. In a heat emitting control device, a mounting plate, a hollow base member attached thereto, said base member having an annular wall portion and an outer concave portion, said base member being arranged over the mounting plate with said concave portion facing outwardly, a heat reflective coating on said concave portion, a convex radiating member having a hollow stem attached to said concave portion to hold said convex member in spaced relation to said concave portion, heater wire embedded in said convex member, temperature responsive resistance means embedded in said convex member, a rheostat arranged between said base member and said mounting plate, and manual adjusting means including a shaft extending through said hollow stem for adjusting said rheostat.

11. In a condition responsive control device of the heat emissive type, a convex member, heater means for said member, means responsive to the temperature of said member, said member having a hollow attaching stem, a mounting means for said member including a concave heat reflecting outwardly extending portion to which said hollow stem is attached, a manually adjustable means for said temperature responsive means including a knob arranged in the outer face of said convex member and having an operating shaft extending through said hollow stem, and a movable concave member which may be adjusted to nest with said concave portion or to abut with said convex member.

12. In a condition responsive control device, a cylindrical member, a mounting base for attaching said member to a wall, strut-like means for connecting said member in spaced relation to said base, a plurality of spaced section reducing longitudinally extending grooves in said member arranged to form heat flow restrictions between the front and rear portions of said member, means for heating the front portion of said member, heat reflective means arranged to cooperate with said grooves for thermally isolating the front portion of said member from the rear portion of the same, said reflective means being constructed and arranged to deflect upwardly moving convection air currents outwardly from said device, and temperature responsive means in heat exchange relation with the front portion of said device.

13. In a condition responsive control device, a cylindrical member, a mounting base for attaching said member to a wall, structural means of relatively small cross-sectional area connecting said base in spaced relation to said member, a plurality of section reducing spaced longitudinally extending grooves in said member arranged to form heat barriers between the outer portion and the rear portion of said member, heat reflector means arranged to cooperate with said grooves in thermally isolating the outer portion of said member from its rear portion, temperature responsive means in heat exchange relation with the outer portion of said member, means for heating said outer portion, and means for restricting convection air currents through the space between said reflective means and said outer portion.

14. In a control device responsive to a plurality of conditions affecting human comfort, a convex member, means for heating said member, temperature responsive resistance means in heat exchange relation with said member, mounting means for attaching said member in spaced relation to a wall, said mounting means being constructed and arranged to provide a relatively poor thermal path from said member to said wall, heat reflective means for minimizing thermal radiation from said convex member in the direction of said mounting means, a rheostat connected in controlling relation to said resistance means, a manually operable means extending through said convex member for adjusting said rheostat, and adjustable baffle means located between said convex member and said reflective means to control air flow over said convex member.

15. In a control device responsive to radiant heat, a mounting base for said device for securing it to a side wall of a room, an exposed heat radiating element spaced from said base, means for heating said element, means responsive to the temperature of said element, connecting means of restricted cross section between said element and said base, and heat reflective means between said element and said base, said heat reflective means being shaped and arranged to deflect convection air currents away from said base.

16. In a control device responsive to a plurality of conditions affecting comfort, an exposed heat radiating element, means for heating said element, means responsive to the temperature of said element, a wall mounting base for said element, connecting means for spacing said element from said base, and heat reflective means between said element and said base, said heat reflective means being proportioned and arranged to shield only a relatively restricted area in the plane of the base from direct radiation from said element and for deflecting convection air currents away from the plane of said base.

LAMONT B. KOONTZ.

REFERENCES CITED

The following references are of record in the file of this patent:

UNITED STATES PATENTS

| Number | Name | Date |
|---|---|---|
| 1,919,330 | Hornung | July 25, 1933 |
| 2,162,098 | McCabe | June 13, 1939 |
| 2,237,077 | Lauck | Apr. 1, 1941 |
| 2,261,582 | Haines | Nov. 4, 1941 |
| 2,273,596 | Rylsky | Feb. 17, 1942 |
| 2,423,781 | Koontz | July 8, 1947 |
| 2,456,619 | Curry | Dec. 21, 1948 |

FOREIGN PATENTS

| Number | Country | Date |
|---|---|---|
| 448,836 | Germany | Aug. 30, 1927 |